Sept. 8, 1959 H. EBERT 2,902,938
HYDRODYNAMIC TORQUE CONVERTER
Filed Dec. 11, 1956
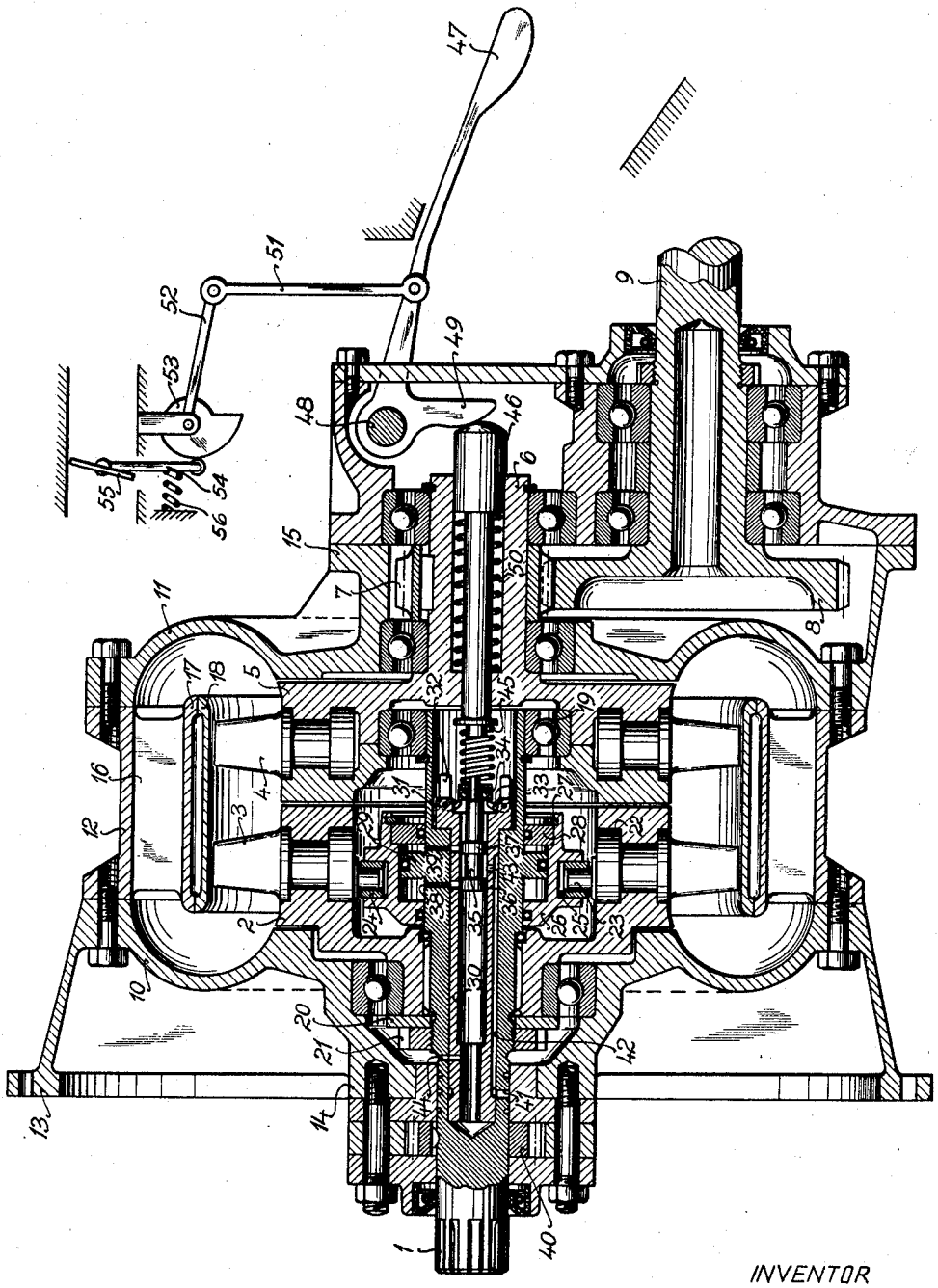
INVENTOR
Heinrich Ebert
By
Patent Agent

United States Patent Office 2,902,938
Patented Sept. 8, 1959

2,902,938

HYDRODYNAMIC TORQUE CONVERTER

Heinrich Ebert, Furth, Bayern, Germany

Application December 11, 1956, Serial No. 627,710

5 Claims. (Cl. 103—87)

The present invention relates to a hydrodynamic torque converter, particularly for use in connection with motor vehicles.

Torque converters of the above mentioned type usually consist of a pump wheel, a turbine wheel and a reaction member or guide wheel. The guide wheel may be so arranged that by means of a free wheel drive it will be able in an unimpeded manner to rotate in one direction within the casing of the torque converter whereas it is prevented from rotating in the opposite direction. Instead of a single turbine wheel, also a plurality of turbine wheels may be provided. In such an instance there will also be provided a plurality of guide wheels. At certain changes in the conditions of operation of the torque converter, the guide wheels will leave their rest positions and will begin to rotate and similarly in inverse manner they will be adapted to stop their rotation and return to their rest positions.

Depending on the design of the blades of the various wheels, the torque converter will have a certain characteristic of operation. In other words, the motor speed with throttle fully opened and with throttle partly opened will be determined by the fixed characteristic of operation of the torque converter depending on the output torque and the output speed, and the motor speeds will differ from each other accordingly. The driving conditions obtained in conformity with the characteristic of operation of the torque converter will differ more or less from the optimum driving conditions for the motor. This enhances drawbacks with regard to the driving operation as well as the life span of the motor vehicle.

It is, therefore, an object of the present invention to provide a hydrodynamic torque converter, especially for motor vehicles, which will overcome the above mentioned drawbacks.

It is another object of this invention to provide a hydrodynamic torque converter, especially for motor vehicles, which will make it possible to change the characteristic of the torque converter continuously regardless of the output torque and the output speed in such a manner that the motor will work at the most favorable conditions within the entire range of operation, i.e. with the throttle partially opened to the throttle fully opened.

These and other objects and advantages of the invention will appear more clearly from the following specification in connection with the accompanying drawing illustrating an axial section through a hydrodynamic torque converted according to the present invention.

*General arrangement*

The torque converter according to the present invention is characterized primarily in that the blades of the pump wheel are so designed and are so journalled in the pump wheel that while the pump wheel is rotating, the blades can be continuously adjusted. In conformity with a further feature of the invention, for purposes of adjusting the blades of the pump wheel, there is provided a speed governor, for instance a centrifugal speed governor, the nominal speed of which is adjusted by means of the accelerator of the motor vehicle in cooperation with the actuation of the gas throttle. If the speed governor and the adjusting mechanism for the pump blades are correspondingly tuned to each other or adjusted relative to each other, it is possible to vary the characteristic of operation of the torque converter in each instance in conformity with the requirements of the drive motor so that the drive motor will be independent of the load and output speed and independently of the driving speed at full open throttle and at partially closed throttle will always work within a certain range of a motor output graph which corresponds to the most favorable conditions of operation of the drive motor, for instance with regard to the consumption of fuel.

*Structural arrangement*

Referring now to the drawing in detail, the input shaft 1 has keyed thereto a pump wheel 2 having arranged therein the pump blades 3. Turbine blades 4 are journalled in a turbine wheel 5 which is provided with a shaft portion 6 having a pinion 7 keyed thereto. A gear 8 having an output shaft 9 connected thereto meshes with the pinion 7. The input shaft 1, the turbine shaft 6, and the output shaft 9 are journalled in ball bearings which are located in bores of the multi-part casing of the torque converter. The multi-part casing is composed primarily of two bowl-shaped parts 10 and 11 serving as flow reversing bowls and of the intermediate part 12. The part 10 is provided with connecting flanges 13 for the driving motor and also with connecting flanges 14 for a gear pump. The part 11 is provided with a connecting flange 15 for a gear casing. The intermediate part 12 houses the guide blades 16 which are connected with an inner ring 17. Pressed into the inner ring 17 is a further ring 18 in which the pump wheel blades 3 and the turbine wheel blades 4 are rotatably arranged. The pump wheel or input shaft 1 is in addition to being journalled in part 10 also journalled in ball bearings 19 in the interior of the turbine wheel 5.

The pump wheel 2 is keyed to the input shaft 1 by means of an intermediate disc 20, nut 21 and a spring ring. The pump wheel 2 is sub-divided transverse to its longitudinal axis along a plane which passes through the radially extending longitudinal axes of the pump wheel blades 3. The pump wheel 2 divided along the plane of its blade wheel axes is provided with bores and contacting surfaces for insertion of the pump wheel blades 3 adapted in conformity with the invention to rotate about their axes. The bottom 22 of the pump wheel blades 3 has crank pivots 23 eccentrically arranged thereto. These pivots which may be integral with the pump blades have mounted thereon sliding members 24. The sliding members 24 engage an annular groove 25 of an adjusting cylinder 26 in such a manner that when the adjusting cylinder 26 is displaced in longitudinal direction of shaft 1, the pump wheel blades 3 will be adjusted about their adjusting axes perpendicular to the pump wheel shaft. To this end, the adjusting cylinder 26 is concentrically arranged on the input shaft 1 and is longitudinally adjustable with regard thereto. The right-hand side (with regard to the drawing) of the adjusting cylinder 26 is closed by a lid 28 pressed into the cylinder 26 and secured in its position by a spring ring 27. An adjusting piston 29 is arranged within the adjusting cylinder 26, said piston 29 being integral with the input shaft 1. The slide fit with regard to the input shaft 1 and also with regard to the adjusting piston 29 is sealed by rubber rings as for instance O-rings.

The input shaft 1 is provided with a bore having a sleeve 30 pressed thereinto. The right-hand side (with regard to the drawing) of the sleeve 30 is provided with eyes 31 for journalling the centrifugal governor weights 32. The weights 32 are respectively tiltable about an axis perpendicular and eccentrically located with regard to the input shaft 1 so that when the input shaft 1 rotates, the crank levers 33 due to the weights 32 will press upon the outer race ring of a ball bearing 34 which is mounted on the longitudinally displaceable and rotatable valve spool 35 within the sleeve 30. The valve spool 35 is provided with two control piston surfaces 36 and 37 which in their position of equilibrium close the bores 38 and 39 extending at both sides of the adjusting piston 29 through the sleeve 30 and input shaft 1. Depending on the position of the valve spool 35, the bores 38 and 39 convey the control oil toward the left or toward the right of piston 29 which oil is delivered by a gear pump 40. The gear pump 40 is arranged on the input shaft 1 and driven by the latter. According to the particular showing in the drawing, the gear pump 40 is shown at the left-hand end of the input shaft 1, only the gear keyed to the input shaft being visible. The control oil delivered by the gear pump 40 is conveyed to the latter through passages (not shown) into bores 41 at the point of the input shaft 1 which is sealed by sealing rings. The oil then passes through said bores 41 into the grooves 42 intermediate the input shaft 1 and sleeve 30. From here the oil is passed through bores 43 in the pressed-in sleeve 30 between the two control pistons 36 of the valve spool 35. The oil which during the control operation leaves the adjusting cylinder 26, may, in conformity with the drawings, escape toward the right directly into the transmission and toward the left through bore 44 at the left end of sleeve 30 and the input shaft 1 radially outwardly into the transmission. From here the oil is again drawn in by the gear pump 40. A control spring 45 presses against the inner race ring of the ball bearing 34 mounted on the valve spool 35 and acts against the forces exerted by the centrifugal weights 32. The control spring 45 is adjustable by means of a push rod 46 which is longitudinally displaceably mounted in the interior of the turbine shaft 6. This adjustment is effected by operation of the accelerator 47. The accelerator 47 is tiltably mounted on a transverse shaft 48 and is connected to a bell crank lever 49. The bell crank lever 49 is adapted to press upon the push rod 46. The return of the push rod 46 is effected by a return spring 50. Linked to the accelerator 47 is a rod system 51 which in response to the actuation of the accelerator automatically moves a lever 52 which turns a cam disc 53. The cam disc 53 is adapted to adjust the gas throttle lever 54 by means of which the gas throttle 55 is opened to a greater or less extent. The gas throttle 54 is biased by a spring 56 against cam 53.

The turbine shaft 6 is integral with the two-part turbine wheel 5 having its two parts screwed together. The turbine wheel 5 is divided along the plane of the blade axes and receives the fixedly clamped-in turbine blades 4.

Operation

When actuating the accelerator 47 to give gas, the cam disc lever 52 is tilted by means of the link system 51 whereby the gas throttle 55 is adjusted for a certain value. At the same time, the bell crank lever 49 mounted on the transverse shaft 48 adjusts the push rod 46 in the turbine shaft 6 so that the control spring 45 is tensioned. In this connection, the centrifugal weights 32 are displaced inwardly toward the transmission axis so that the valve spool 35 is moved toward the left. The oil fed by the gear pump 40 will then pass to the left side of the adjusting piston 29 and will displace the adjusting cylinder 26 toward the left into the position shown in the drawing. In connection therewith, the pump blades 3 are adjusted for a smaller pitch until the speed of the drive motor, which speed increases in view of the depression of the accelerator and the adjustment of the blades, has reached a value at which the centrifugal weights 32 in view of the increased centrifugal force have displaced the valve spool 35 against the thrust of the control spring 45 into the position of equilibrium shown in the drawing.

When the gas supply is decreased, in an inverse manner the gas throttle 55 is closed more or less while simultaneously the control spring 45 is detensioned so that at the first instant the valve spool 35 is moved toward the right. In connection therewith, the adjusting cylinder 26 is likewise displaced toward the right thereby adjusting the pump wheel blades 3 for a larger pitch. This operation lasts until with now decreasing speed, the relieved control spring 45 can move the valve spool into the position of equilibrium shown in the drawing against the effect of the decreasing centrifugal forces of the weights 32.

The otherwise rigid characteristic of operation of the torque converter is thus independently of the output torque and the output speed changed continuously so that the motor will work in conformity with the provided output speed graph under the most favorable conditions within a range from partially open throttle to fully open throttle.

It is, of course, understood that the present invention is by no means limited to the particular construction shown in the drawing but also comprises any modifications within the scope of the appended claims.

What I claim is:

1. In a hydrodynamic torque converter having an input shaft, at least one pump wheel arranged for driving connection with said input shaft, a plurality of pump wheel blades carried by said pump wheel and respectively adjustable about their longitudinal axes, fluid operable cylinder piston means arranged within said pump wheel and having one member in engagement with said pump wheel blades for adjusting the same while said pump wheel is rotating a fluid pump, a cylinder provided within said input shaft and connected with the delivery side of said fluid pump, said cylinder having passage means for admitting actuating fluid to and releasing fluid from said cylinder piston means, control valve means arranged within said cylinder for controlling said passage means, and centrifugal governor means arranged within said torque converter and rotatably connected to said pump wheel, said centrifugal governor means including speed responsive means for engagement with and actuating said control valve means to thereby control said control valve means.

2. In combination with an internal combustion engine: a fluid pump, a hydrodynamic torque converter having an input shaft arranged for driving connection with said engine and having a cylinder therein substantially coaxial with said input shaft and connected with the delivery side of said fluid pump, said converter including at least one pump wheel with a plurality of pump wheel blades respectively adjustable about their longitudinal axes, a fluid operable cylinder piston system arranged within said pump wheel and comprising a member engaging said blades for adjusting the same while said pump wheel is rotating, said cylinder within said input shaft having passage means for admitting actuating fluid to and releasing fluid from said cylinder piston system, a control valve member reciprocably mounted within said cylinder for controlling said passage means to thereby control the supply of actuating fluid to and the discharge of fluid from said cylinder piston system, speed responsive governor means rotatably connected to said pump wheel and including speed responsive means for engagement with and actuating said control valve means, said speed responsive means being operable in response to an increase in the speed of said pump wheel to move said control valve member in a first direction, spring means continuously urging said control valve member to move in a second direction opposite to said first direction, accelerator means arranged for controlling the supply of fuel to said internal combustion engine, and means interposed between and operatively connected to said accelerator means and said spring means for conveying an adjusting movement of said accelerator means to said spring means.

3. In combination with an internal combustion engine: a fluid pump, a hydrodynamic torque converter having an input shaft arranged for driving connection with said engine and having a cylinder therein extending in longitudinal direction of said input shaft and arranged for connection with the delivery side of said fluid pump, said converter including at least one pump wheel with a plurality of pump wheel blades respectively adjustable about their longitudinal axes, a fluid operable cylinder piston system arranged within said pump wheel and comprising a member engaging said blades for adjusting the same while said pump wheel is rotating, said cylinder within said input shaft having passage means for admitting actuating fluid to and releasing fluid from said cylinder piston system, a control valve member reciprocably mounted within said cylinder for controlling said passage means, speed responsive governor means rotatably connected to said pump wheel, said centrifugal governor means including speed responsive means for engagement with and actuating said valve member, said speed responsive means being operable in response to an increase in the speed of said pump wheel to move said control valve member in a first direction, spring means continuously urging said control valve member to move in a second direction opposite to said first direction, a gas throttle for controlling the supply of gas to said internal combustion engine, accelerator means for controlling the operation of said gas throttle, said accelerator means including a cam having its cam surface designed so that with fully open gas throttle, the speed of said engine can still be varied, and means interposed between and operatively connected with said accelerator means and said spring means for conveying an adjusting movement of said accelerator means to said spring means.

4. A hydrodynamic torque converter according to claim 1, in which each of said blades is provided with a stud arranged eccentrically with regard to the longitudinal axis of each blade, and in which said fluid operable cylinder piston means comprises a stationary member and also comprises a movable member provided with a peripheral groove engaged by said studs and movable to adjust the same and thereby said blades.

5. In a hydrodynamic torque converter having an input shaft: at least one pump wheel arranged for driving connection with said input shaft, a plurality of pump wheel blades carried by said pump wheel and respectively adjustable about their longitudinal axes, fluid operable cylinder piston means arranged within said pump wheel and having one member in engagement with said pump wheel blades for adjusting the same while said pump wheel is rotating, a cylinder arranged within said input shaft and extending in longitudinal direction thereof, gear pump means rotatably connected to said pump wheel and having its delivery side connected to said cylinder for delivering actuating fluid thereto, said cylinder having passage means arranged for admitting actuating fluid to and releasing fluid from said cylinder piston means, control valve means arranged within said cylinder for controlling said passage means, and centrifugal governor means arranged within said torque converter and rotatably connected to said pump wheel, said centrifugal governor means including speed responsive means for engagement with and actuating said control valve means.

References Cited in the file of this patent
UNITED STATES PATENTS

| | | |
|---|---|---|
| 2,178,356 | Brunner | Oct. 31, 1939 |
| 2,287,374 | Dodge | June 23, 1942 |